United States Patent
Staack et al.

(10) Patent No.: US 12,227,703 B2
(45) Date of Patent: Feb. 18, 2025

(54) FOAMING SYSTEM FOR EFFICIENT PLASMA PROCESSING OF HEAVY HYDROCARBON

(71) Applicant: Texas A&M University System, College Station, TX (US)

(72) Inventors: David Staack, College Station, TX (US); Md Abdullah Hil Baky, Bryan, TX (US); Charles S. Martens, College Station, TX (US); Howard B. Jemison, Houston, TX (US)

(73) Assignee: TEXAS A&M UNIVERSITY SYSTEM, College Station, TX (US)

( * ) Notice: Subject to any disclaimer, the term of this patent is extended or adjusted under 35 U.S.C. 154(b) by 141 days.

(21) Appl. No.: 17/911,609

(22) PCT Filed: Mar. 17, 2021

(86) PCT No.: PCT/US2021/022733
§ 371 (c)(1),
(2) Date: Sep. 14, 2022

(87) PCT Pub. No.: WO2021/188650
PCT Pub. Date: Sep. 23, 2021

(65) Prior Publication Data
US 2023/0121041 A1 Apr. 20, 2023

Related U.S. Application Data

(60) Provisional application No. 62/990,942, filed on Mar. 17, 2020.

(51) Int. Cl.
*C10G 49/20* (2006.01)
*C09K 23/00* (2022.01)
(Continued)

(52) U.S. Cl.
CPC ............ *C10G 49/20* (2013.01); *C09K 23/003* (2022.01); *C10G 49/002* (2013.01);
(Continued)

(58) Field of Classification Search
CPC .................. C10G 49/002; C10G 49/20; C10G 2300/1037; C10G 2300/4012;
(Continued)

(56) References Cited

U.S. PATENT DOCUMENTS

| 5,333,687 | A | 8/1994 | Osterloh |
| 7,565,933 | B2 * | 7/2009 | Kippie ..................... C09K 8/58 |
| | | | 166/309 |

(Continued)

FOREIGN PATENT DOCUMENTS

| WO | WO-95/20637 A2 | 8/1995 |
| WO | WO-2019/204739 A1 | 10/2019 |
| WO | WO-2021/188650 A1 | 9/2021 |

OTHER PUBLICATIONS

Aoki, Hironori, Katsuhisa Kitano, and Satoshi Hamaguchi. "Plasma generation inside externally supplied Ar bubbles in water." Plasma Sources Science and Technology 17.2 (2008): 025006.
(Continued)

*Primary Examiner* — In Suk C Bullock
*Assistant Examiner* — Jason Y Chong
(74) *Attorney, Agent, or Firm* — FOLEY & LARDNER LLP

(57) ABSTRACT

An apparatus for converting heavy hydrocarbons to light hydrocarbons includes an inlet capable of supplying a pre-foaming mixture comprising a hydrocarbon to be processed and a processing gas, wherein the processing gas is dissolved in the hydrocarbon to be processed; a foam generator configured to receive the pre-foaming mixture at a first pressure, compress the pre-foaming mixture to a second
(Continued)

pressure that is higher than the first pressure by routing it through a nozzle; and generate a foam by allowing the pre-foaming mixture at the second pressure to expand in a chamber at a third pressure that is lower than the first or second pressures; a plasma reactor, wherein the plasma reactor is capable of receiving the foam and comprises at least one pair of spark gap electrodes capable of subjecting the foam to a plasma discharge to yield a processed mixture; and an outlet capable of receiving the processed mixture.

18 Claims, 12 Drawing Sheets

(51) Int. Cl.
  *C10G 15/12* (2006.01)
  *C10G 49/00* (2006.01)
(52) U.S. Cl.
  CPC ............... *C10G 2300/1037* (2013.01); *C10G 2300/4012* (2013.01); *C10G 2300/802* (2013.01)
(58) Field of Classification Search
  CPC .. C10G 2300/802; C10G 15/12; C10G 32/02; C09K 23/003; B01J 2219/0809; B01J 2219/0869; B01J 2219/0884; B01J 4/002; B01J 19/088
  See application file for complete search history.

(56) References Cited

U.S. PATENT DOCUMENTS

| | | | |
|---|---|---|---|
| 7,931,785 | B2 | 4/2011 | Ishmukhametov et al. |
| 8,770,279 | B2 | 7/2014 | Saini et al. |
| 9,988,579 | B2 | 6/2018 | Novoselov |
| 2007/0181307 | A1 | 8/2007 | Yang |
| 2008/0257556 | A1 | 10/2008 | Kippie et al. |
| 2015/0076034 | A1 | 3/2015 | Etter |
| 2017/0137727 | A1 | 5/2017 | Chornet et al. |
| 2021/0155855 | A1 | 5/2021 | Staack et al. |

OTHER PUBLICATIONS

Beneventi D., Carre B., Gandini A. (2001) Role of surfactant structure on surface and foaming properties, Colloids and Surfaces A: Physicochemical and Engineering Aspects 189, 65-73.
Blázquez, Christian, et al. "Non-aqueous and crude oil foams." Oil & Gas Science and technology—Revue d'IFP Energies nouvelles 69.3 (2014): 467-479.
Bruggeman, P. J., et al. "Plasma-liquid interactions: a review and roadmap." Plasma sources science and technology 25.5 (2016): 053002.
Hammoudeh, S. and J.C. Reboredo, Oil price dynamics and market-based inflation expectations. Energy Economics, 2018. 75: p. 484-491.
Hao, H., et al., Non-thermal plasma enhanced heavy oil upgrading. Fuel, 2015. 149: p. 162-173.
Li, M.-W., Y.-L. Tian, and G.-H. Xu, Characteristics of carbon dioxide reforming of methane via alternating current (AC) corona plasma reactions. Energy & fuels, 2007. 21(4): p. 2335-2339.
Matsui, Y., et al., Liquid-phase fuel re-forming at room temperature using nonthermal plasma. Energy & fuels, 2005. 19(4): p. 1561-1565.
Morrison I.D. (1996) Ross's rule: Sydney Ross and the phase diagram, Colloids and Surfaces A: Physicochemical and Engineering Aspects 118, 257-261.
Rollier, J.-D., et al., Experimental study on gasoline reforming assisted by nonthermal arc discharge. Energy & Fuels, 2008. 22(1): p. 556-560.
Tu, X. and J. Whitehead, Plasma-catalytic dry reforming of methane in an atmospheric dielectric barrier discharge: Understanding the synergistic effect at low temperature. Applied Catalysis B: Environmental, 2012. 125: p. 439-448.
Wang, K., et al., CO2-free conversion of fossil fuels by multiphase plasma at ambient conditions. Fuel, 2021. 304: p. 121469.
Wang, K., et al., Electric fuel conversion with hydrogen production by multiphase plasma at ambient pressure. Chemical Engineering Journal, 2022. 433: p. 133660.
Wang, K., et al., Relative breakdown voltage and energy deposition in the liquid and gas phase of multiphase hydrocarbon plasmas. Journal of Applied Physics, 2021. 129(12): p. 123301.
Wang, K., et al., Role of bubble and impurity dynamics in electrical breakdown of dielectric liquids. Plasma Sources Science and Technology, 2021. 30(5): p. 055013.
International Search Report and Written Opinion for PCT/US2021/022733, mailed Jul. 27, 2021, 27 pages.

* cited by examiner (a) (b)

(c) (d)

FOAMING SYSTEM FOR EFFICIENT PLASMA PROCESSING OF HEAVY HYDROCARBON

CROSS-REFERENCE TO RELATED APPLICATIONS

This application is a National Stage Application of PCT/US2021/022733, filed Mar. 17, 2021, which claims the benefit of and priority to U.S. Provisional Patent Application No. 62/990,942, filed on Mar. 17, 2020, the entire disclosure of each of which is incorporated herein by reference in its entirety.

FIELD

The present technology generally relates to the use of a non-thermal plasma in the processing of heavy-crude oil using a foaming system. More specifically, it relates to the use of a non-thermal plasma in the conversion of heavy hydrocarbons to lighter hydrocarbons using a foaming system.

SUMMARY

In one aspect, provided is an apparatus comprising a hydrocarbon inlet; a first tank for receiving a hydrocarbon to be processed from the hydrocarbon inlet; a pressurized gas supply housing a processing gas; a jet ejector for mixing the processing gas and the hydrocarbon to be processed to yield a pre-foaming mixture; a flow controller for regulating the flow of the processing gas into the jet ejector; a first pump capable of pumping the hydrocarbon to be processed from the first tank into the jet ejector; a second pump for compressing the pre-foaming mixture; a foam generator, wherein the foam generator is configured to receive the pre-foaming mixture at a first pressure, compress the pre-foaming mixture to a second pressure that is higher than the first pressure by routing it through a nozzle, and generate a foam by allowing the pre-foaming mixture at the second pressure to expand in a chamber at a third pressure that is lower than the first or second pressures; a plasma reactor, wherein the plasma reactor is capable of receiving the foam and comprises at least one pair of spark gap electrodes capable of subjecting the foam to a plasma discharge to yield a processed mixture; a second tank capable of receiving the processed mixture; a first gas outlet downstream of the plasma reactor and capable of removing gas from the apparatus; a third pump capable of receiving the processed mixture and configured to defoam the processed mixture; a product outlet for removing at least a portion of the processed mixture from the apparatus; and a second gas outlet downstream of the third pump and capable of removing gas from the apparatus. In some embodiments, provided is a method for heavy hydrocarbon to light hydrocarbon conversion, the method including processing a heavy hydrocarbon using the apparatus described herein.

In another aspect, provided is an apparatus comprising an inlet capable of supplying a pre-foaming mixture comprising a hydrocarbon to be processed and a processing gas, wherein the processing gas is dissolved in the hydrocarbon to be processed; a foam generator configured to receive the pre-foaming mixture at a first pressure, compress the pre-foaming mixture to a second pressure that is higher than the first pressure by routing it through a nozzle, and generate a foam by allowing the pre-foaming mixture at the second pressure to expand in a chamber at a third pressure that is lower than the first or second pressures; a plasma reactor, wherein the plasma reactor is capable of receiving the foam and comprises at least one pair of spark gap electrodes capable of subjecting the foam to a plasma discharge to yield a processed mixture; and an outlet capable of receiving the processed mixture. In some embodiments, provided is a method for heavy hydrocarbon to light hydrocarbon conversion, the method including processing a heavy hydrocarbon using the apparatus described herein.

In another aspect, provided is a foam generator comprising a fluid inlet; a chamber; a nozzle interposed between the inlet and the chamber and of smaller diameter than the fluid inlet or the chamber; a fluid outlet disposed within the chamber; and a mixing unit disposed within the chamber between the nozzle and the fluid outlet; wherein a foam can be generated by passing a mixture comprising a processing gas dissolved in a hydrocarbon to be processed through the fluid inlet, through the nozzle, and into the chamber.

In a further aspect, provided is an apparatus for the foaming of a heavy crude oil, the apparatus comprising: a fluid inlet configured to receive a pressurized mixture of a heavy crude oil and a hydrogen containing gas at least partially dissolved in the heavy crude oil; a chamber maintained at or near atmospheric pressure; a nozzle interposed between the fluid inlet and the chamber and of a smaller diameter than the fluid inlet or the chamber; and a fluid outlet connected to the chamber; wherein the apparatus is configured to cause foaming of the pressurized mixture upon passing through the nozzle and into the chamber. In some embodiments, the hydrogen containing gas is a $C_1$-$C_5$ hydrocarbon gas. In some embodiments, the hydrogen containing gas is methane, ethane, propane, n-butane, iso-butane, n-pentane, iso-pentane, or neo-pentane. In any of the above embodiments, the apparatus is configured to provide a pressure difference between the fluid inlet and the chamber of about 140 psig. In some embodiments, the pressure difference may be from about 140 psig to about 500 psig. This may include a pressure difference of about 140 psig to about 400 psig, about 140 psig to about 300 psig, about 140 psig to about 200 psig, about 200 psig to about 600 psig or about 200 psig to about 300 psig.

In a further aspect, an apparatus for the conversion of a heavy crude oil (i.e. those having an API Gravity of <22) to lighter hydrocarbons (i.e. those having an API Gravity of >30) with a non-thermal plasma, the apparatus comprising: a first tank for receiving the heavy crude oil; a jet injector fluidly connected to the first tank, the jet injector configured to, under pressure, inject a hydrogen containing gas into a portion of the heavy crude oil to form a pressurized mixture comprising the heavy crude oil and at least partially dissolved therein the hydrogen containing gas; a foam generator fluidly connected to the jet injector, the foam generator comprising: a fluid inlet configured to receive the pressurized mixture from the jet injector; a chamber maintained at or near atmospheric pressure; and a nozzle interposed between the fluid inlet and the chamber and of a smaller diameter than the fluid inlet or the chamber; and a fluid outlet connected to the chamber; and a non-thermal plasma reactor fluidly connected to the fluid outlet, the non-thermal plasma reactor comprising at least two electrodes connected to pulsed high voltage source; wherein the apparatus is configured to cause foaming of the pressurized mixture upon passing through the nozzle and into the chamber. In some embodiments, the hydrogen containing gas is a $C_1$-$C_5$ hydrocarbon gas. In some embodiments, the hydrogen containing gas is methane, ethane, propane, n-butane, iso-butane, n-pentane, iso-pentane, or neo-pentane. In any of the above embodiments, the apparatus is configured to provide a pressure difference between the fluid inlet and the chamber of about 140 psig.

In any of the above embodiments, the apparatus may further include a second tank configured to receive an effluent from the non-thermal plasma reactor, the effluent comprising a higher concentration of lighter hydrocarbons than were present in the pressurized mixture. In any of the above embodiments, the apparatus may further include a condensor fluidly connected to the second tank, wherein the condensor is configured to receive and separate the lighter hydrocarbons from the effluent, and wherein at least a portion of the separated lighter hydrocarbons are separated to a first product stream. In any of the above embodiments, the apparatus may further include a recycle stream from the condensor to the first tank, the recycle stream configured to return unreacted heavy crude oil and other reaction products from the non-thermal plasma reactor to the first tank.

In yet another embodiment, provided is a method of non-thermal plasma generation of lighter hydrocarbons from a heavy crude oil, the method comprising: generating a pressurized mixture of a hydrogen containing gas and the heavy crude oil at a first pressure; passing the pressurized mixture through a nozzle into a chamber maintained at a second pressure that is lower than the first pressure, wherein upon passing through the nozzle the pressurized mixture forms a crude oil foam; and subjecting the crude oil foam to a non-thermal plasma reactor to convert at least a portion of the heavy crude oil into lighter hydrocarbons. In any such embodiments, the crude oil foam may exhibit an average bubble diameter of 100 to 150 microns. In any of the above embodiments, the crude oil foam may have a volume that is at least two times larger than the heavy crude oil used to form the foam. In any of the above embodiments, the method may further include conveying an effluent from the non-thermal plasma reactor, the effluent comprising unreacted heavy crude oil and the lighter hydrocarbons, wherein a concentration of the lighter hydrocarbons is greater in the effluent than in the pressurized mixture. In any such embodiment, the method may further include collecting a product stream comprising the lighter hydrocarbons. In any of the above embodiments, prior to generating the pressurized mixture, the heavy crude oil may be mixed with a diluent. In such embodiments, the diluent may include mineral oil, or any light hydrocarbon liquids such as, but not limited to, pentane, hexane, heptane, and the like, and any isomers thereof.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Plasma discharge in liquids are used to generate reactive plasma species such as radicals, excited atoms, ions, and the like, for chemical processing of the liquids. Some of these applications use high power/high voltage discharges to break down the liquids, and excess power is used to assist in chemical process. In some applications, part of the high energy supplied to the liquid is initially used to evaporate the liquid, which leads to the generation of small gas bubbles due to local overheating caused by highly concentrated current. In such applications, the liquid temperature, at least close to the breakdown region, is generally high due to localized overheating.

Figure 1:
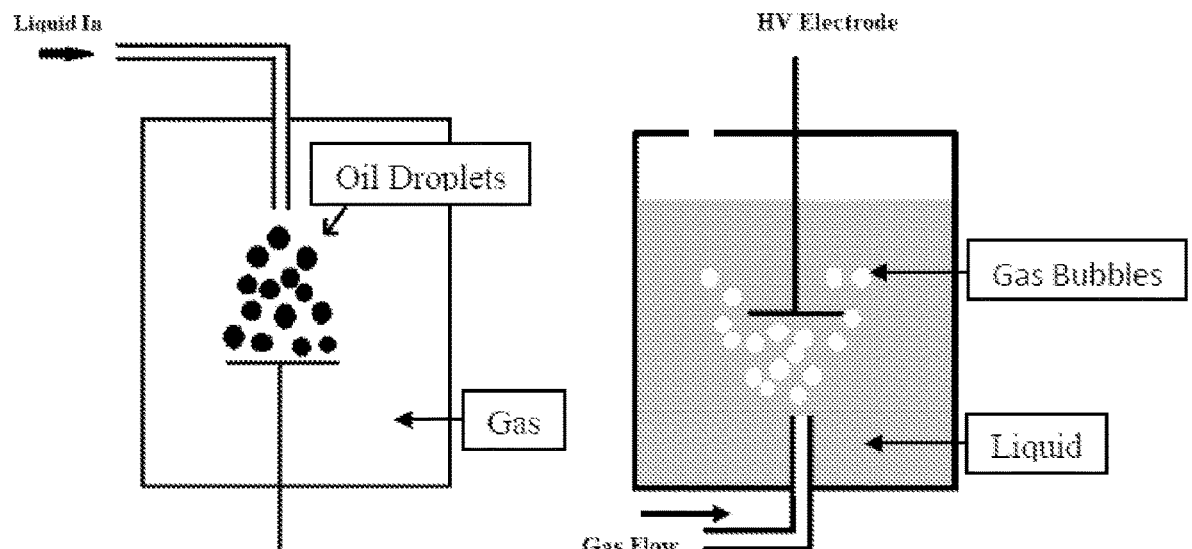
FIG. 1 is a depiction of (a) dispersed liquid in gas system (aerosol), (b) dispersed gas in liquid system (bubble), (c) dispersed gas in liquid system (highly foamed), and (d) moderately foamed system, according to various embodiments.
Figure 1:
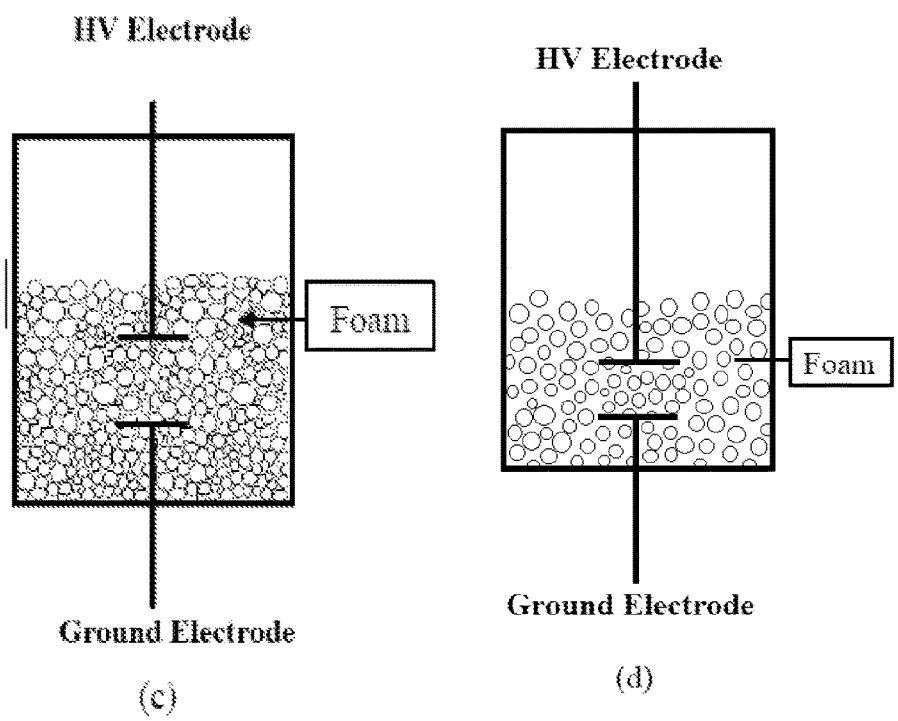

Plasma discharges are understood to interact with the chemical components in the liquids at the plasma-liquid interface. This interface is the boundary between the gas and liquid phases. Direct liquid-phase discharges utilize a gas phase plasma to induce reactivity in the liquid. Multiphase plasma discharges utilize a plasma with dispersed liquid in gas (aerosols), or a plasma with dispersed gas in liquid (bubbles and foams). Multiphase plasmas can maximize the plasma liquid interface increasing the number bubble or droplets in the system, as illustrated in FIG. 1. For liquid processing, external gas bubbling is generated by injecting gas through a capillary tube into the liquid to increase the liquid-volume ratio increases.

Figure 12:
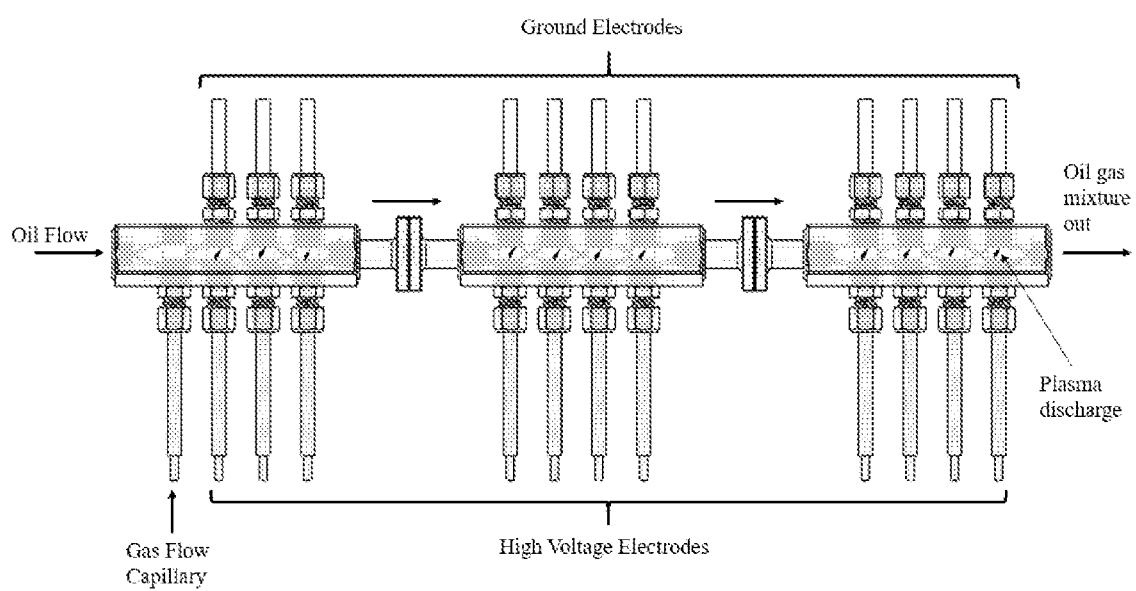
FIG. 12 is a diagram of a capillary system.

In an experiment, a plasma was generated in a reactor with two electrode gaps. The high voltage electrodes also worked as a capillary to carry a hydrocarbon gas at a controlled flow rate. Liquid hydrocarbon flows through the reactor from left to right with the help of a positive displacement pump. Given the same electrode gap, applied voltage, current and gas flow rate through the capillaries, high voltage breakdown occurs at similar pulsing frequency in both gaps. If gas flow at an upstream capillary is turned off, breakdown occurs at a downstream gap only because it would require higher voltage to breakdown through a layer liquid hydrocarbon with no gas between the electrodes at upstream gap. The downstream gap with gas flow therefore gives an easier path to breakdown. However, if gas flow in the downstream gap is turned off keeping the flow from upstream capillary only, both gaps still experiences electrical breakdown since gas from upstream capillary flows through the downstream gap as well. Since bubble dynamics and flow pattern in the downstream gap is different, it experiences breakdown at a different pulsing frequency compared to upstream gap. This idea of not having gas flow through individual capillaries supports the notion of foaming crude plasma processing and this will hugely simplify the processing unit of hydrocarbon reforming eliminating the need of controlling gas flow through each capillaries. This phenomenon has been tested in a scaled-up twelve gap flow reactor FIG. 12 where gas was controlled from the first capillary and the rest of the capillary electrodes were only subjected to high voltage and was not carrying any gas. The first capillary electrode was not connected to high voltage to check whether gas flow being charged while still in the capillary had any effect on the breakdown. As illustrated in FIG. 12, gas flow from first capillary only or gas not being charged prior to flowing through the gap did not seemingly have any effect on the electrical breakdown and therefore plasma discharge was observed in the rest of the eleven electrode gaps.

Foams are an extreme condition of bubbling. Foam is a two-phase system with a gas dispersed phase and a liquid phase as a matrix. Highly concentrated gas bubbles are extremely close to each other and the liquid works as a membrane between them. Provided herein is a system for processing of heavy crude oil to lighter fractions using a non-thermal plasma with a foam.

Provided herein is a system to facilitate gas dissolution in a heavy hydrocarbon liquid under high pressure, which is then suddenly depressurized to help nucleate the dissolved gas bubbles and create a foam which is then subject to a non-thermal plasma for conversion of the heavy hydrocarbon to lighter hydrocarbon fractions. In the studies herein, propane was used as a gas for dissolution, as it has a lower saturation pressure than methane (compare 140 psig to about 700 psig, respectively, at room temperature).

Figure 2:
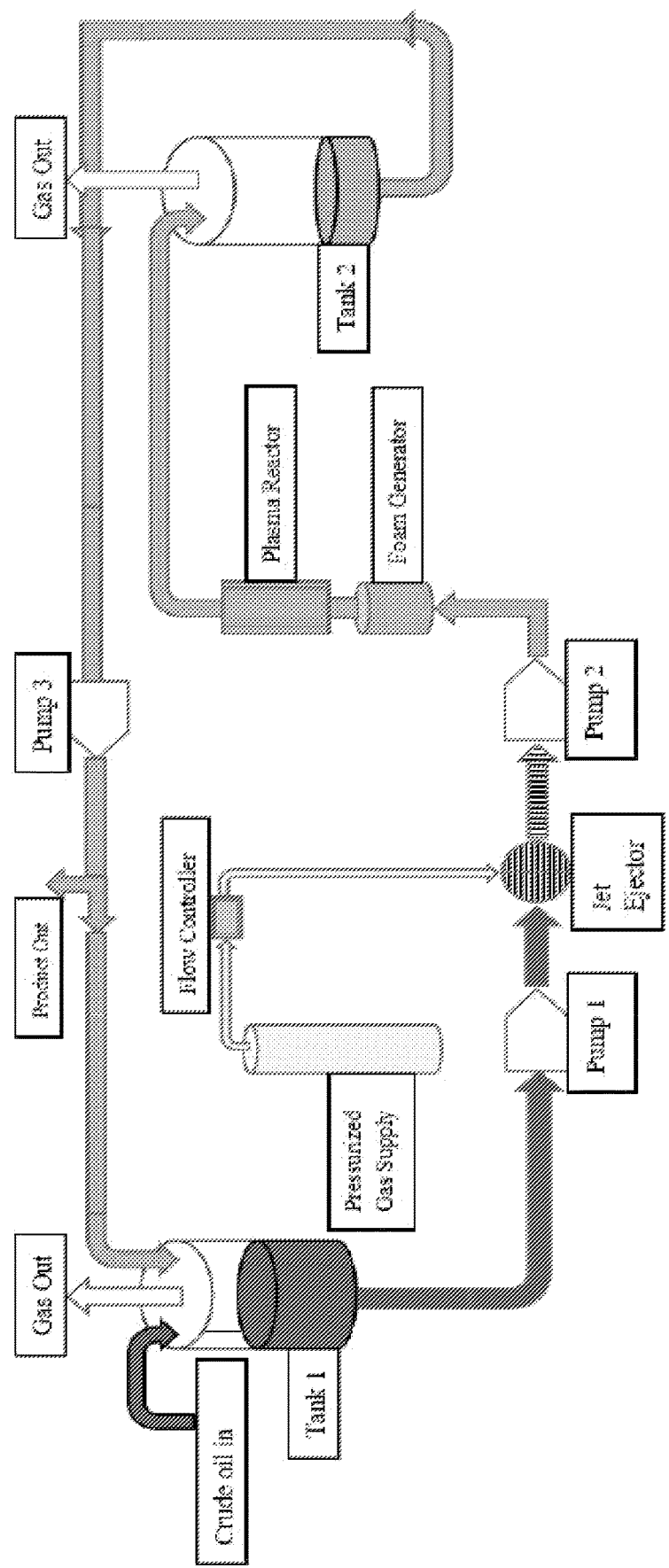
FIG. 2 is a diagram of a system for plasma processing of foaming crude oil or other hydrocarbon, according to various embodiments.

FIG. 2 is an illustration of the system that has been designed for crude oil foaming for plasma processing. As illustrated, a sample of heavy crude oil (Crude oil in) is introduced into Tank 1. Gases from Tank 1 may be evacuated to a vent or to a condenser (not shown) to condense any recoverable liquids and separate them from other gases that may be used in the gas supply. If there are gases present, they may be further compressed by a compressor (not shown) and reintroduced to the system along with the pressurized gas and through the flow controller. The heavy crude oil is then pumped from Tank 1 through Pump 1 in a Jet Ejector where it is mixed with a pressurized gas from the pressurized gas supply through the flow controller. The gas that is to be supplied at pressure is a light hydrocarbon, for example, methane, ethane, propane, or butane. The pressurized gas may be pressurized to a suitable pressure. Illustrative pressure may be from about 30 to 100 psig, from about 40 to 100 psig, from about 50 to 100 psig, from about 50 to 85 psig, or from about 50 to 70 psig. The resulting propane-crude mixture is then compressed by Pump 2 to a higher pressure (about 100 to about 200 psig, about 100 to about 150 psig, or about 120 to about 140 psig), where the pressurized gas dissolves into the heavy crude oil to form a heavy crude oil with dissolved gas. The heavy crude oil with dissolved gas is then passed through a small diameter nozzle (i.e. on the order of about 0.1 to 1 mm, or about 0.5 mm in diameter) inside the Foam Generator, to induce a further pressure rise. After the dissolved crude in the gas passes the small diameter nozzle in the Foam Generator, the mixture is allowed to expand suddenly at atmospheric pressure, also within the Foam Generator, to generate a heavy crude oil foam.

Figure 3:
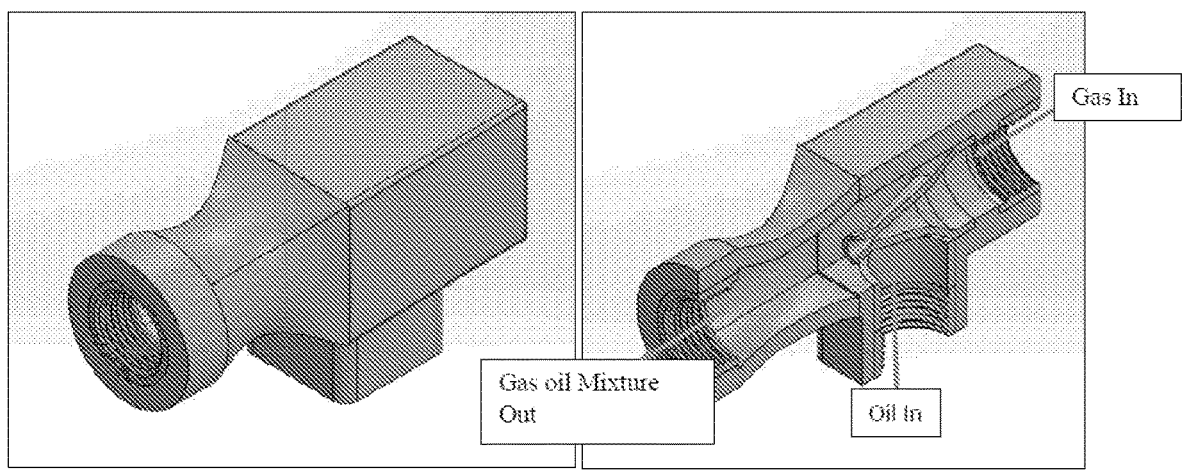
FIG. 3 is a schematic of a jet ejector for mixing gas and liquid, according to various embodiments.
Figure 4:
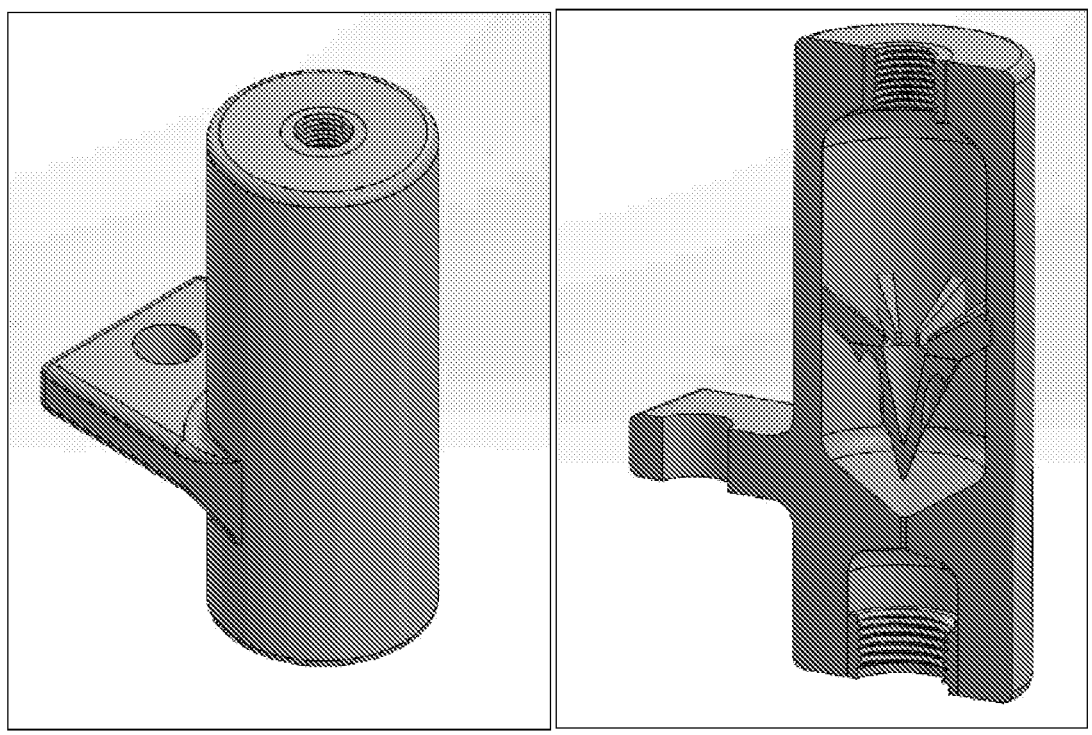
FIG. 4 is a scaled schematic of a foam generator, according to various embodiments.

The Foam Generator is designed to generate a pressure rise with the nozzle and a pressure drop necessary for the depressurization of dissolved gas to maximize foam formation. FIGS. 3 and 4 illustrate designs for a Foam Generator. The Foam Generator houses two different sections: (1) a high-pressure side upstream of the nozzle and (2) a low-pressure side downstream of the nozzle. The Foam Generator is designed to withstand a pressure of 200 psig with a factor off safety of about 20. The pressure limit of the reactor depends on the gas used for the system. With a primary purpose of hydrogen donation to the system in the process of crude oil breakdown, a hydrocarbon gas of low carbon number, is desired. Accordingly, although propane is discussed above, hydrocarbons such as methane, ethane, propane, and butanes may be used. For example, methane has the lowest carbon number among the hydrocarbon gases, but it has a higher saturation pressure at room temperature (e.g. about 700 psig). However, as noted above, the saturation pressure at room temperature for propane is about 140 psig, at which temperature and pressure propane changes its phase into liquid propane. The systems should be built to withstand the saturation pressures for the particular hydrocarbon gas to be used.

The heavy crude oil foam is then subjected to a non-thermal plasma in the Plasma Reactor. This non-thermal plasma reactor is a narrow closed channel of approximately 0.4 inch by 0.25 inch. It houses one or multiple sets of high voltage and ground electrode sticking from opposite sides with an adjustable gap length.

Effluent from the Plasma Reactor is then directed to Tank 2, where gas is allowed to escape and is recovered for further reaction. For example, excess gas may be recovered by sending the gas through an optional condenser (not shown; but the same as or identical to that which is optionally used for gas from Tank 1) to condense any recoverable liquids and separate them from other gases that may be used in the gas supply. If there are gases present, they may be further compressed by a compressor (not shown) and reintroduced to the system along with the pressurized gas and through the flow controller.

Pump 3 then moves the effluent from Tank 2 to the product out stage where lighter hydrocarbons may be recovered, and unreacted or heavier hydrocarbons from the heavy crude oil are recycled through the system by being reintroduced to Tank 1. Pump 3 also acts as a de-foamer to prevent or at least minimize sending foaming crude back to Tank 1, where foaming is not desired. Sending foaming crude back to Tank 1 may allow for additional degassing through the Gas Out vent, and it will negatively impact the pumping of the crude to the Jet Ejector.

Using the system described above, foaming through depressurization of dissolved gases generated foam with 100-150 micron diameter bubbles. The bubble network in the foaming system can provide for different gas fractions, or foaminess, that may be analyzed with microscopic lens integrated with a high speed camera. High bubble density is observed at higher foaminess. The higher bubble density and small bubble size in the foam leads to improved interactions of the heavy hydrocarbon with the non-thermal plasma.

Foaminess is defined by the ratio of gas volume is a certain amount of foam to the volume of liquid in that foam (i.e. foaminess=[($V_{gas}$ in a foam)/($V_{oil}$ in the foam)]. Foaminess achieved using the apparatus described herein has been observed as high as about 400%, which is much higher than that achieved through any other foaming process. As an illustration of foaminess, 264 ml of heavy crude oil foam was collected after being generated in the foam generation apparatus described herein. After waiting for several minutes, gas was able to escape the foam, leaving behind a 54 ml volume of liquid crude oil. This equates to a foaminess [(264 ml−54 ml)/54 ml*100=389%], or a total volume of foam generated of about 4 times that of the crude oil, at least for this illustration.

In some embodiments, the heavy crude oil crude may be diluted using a diluent such as mineral oil. In some examples, different percentage fractions of mineral oil (having a viscosity 105 cP (centipoise)) were blended with heavy crude oil to reduce the viscosity to a point which was amenable to pumping and handling. For example, at 30° C. the viscosity of the heavy crude oil tested was about 750 cP. After blending with mineral oil, the viscosity could be reduced to 100 cP.

However, the viscosity of a heavy crude oil-mineral oil solution is not the only factor controlling the foaminess of the system. Temperature, gas flow rate, and pressure of the system all impact the gas fraction in the foam. The temperature of the crude should be monitored to predict the gas fraction in the foam. Experiments were also conducted with 100% mineral oil (viscosity 105 cP), heavy crude oil diluted by mineral oil (5% and 10% crude by volume is mixed with mineral oil). All experiments were conducted at room temperature. A higher operating temperature would help further reduce the viscosity of the mixture hence to achieve a different foaminess but that would also require heating up the storage tanks and insulating the flow system. Gas flow rate was controlled to control the gas to liquid ratio in the foam. A maximum foaminess of about 400% or a gas fraction of 80% in the foam was able to be successfully achieved with 5SLPM gas flow rate and 10% diluted crude oil mixture.

Figure 5A:
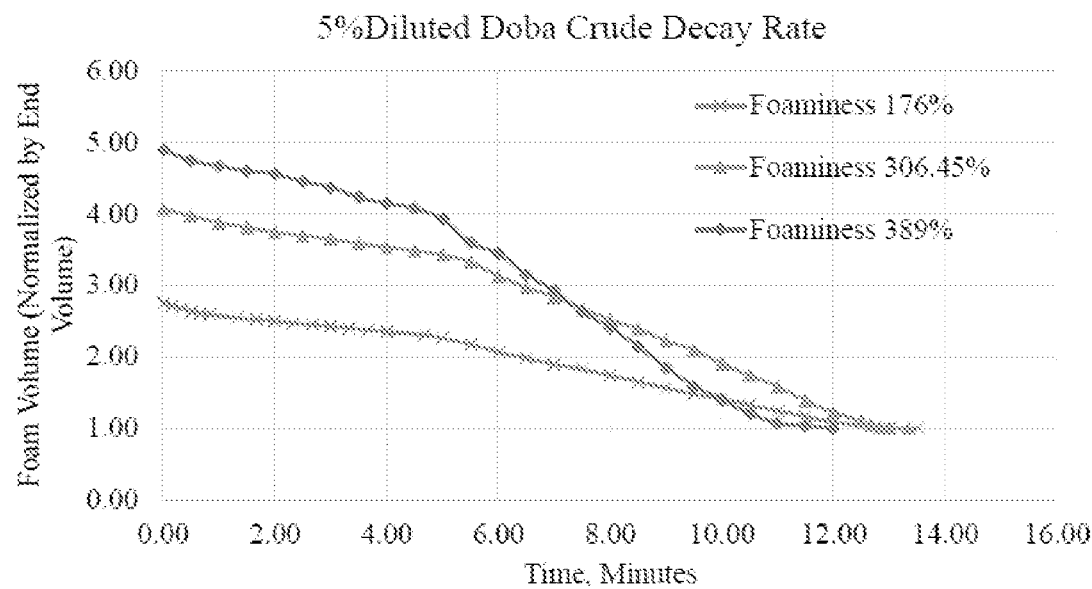
FIG. 5A is a representative of a foam decay of 5% diluted heavy crude foam, and FIG. 5B foam decay of 10% diluted heavy crude oil foam, according to various embodiments.
Figure 5B:
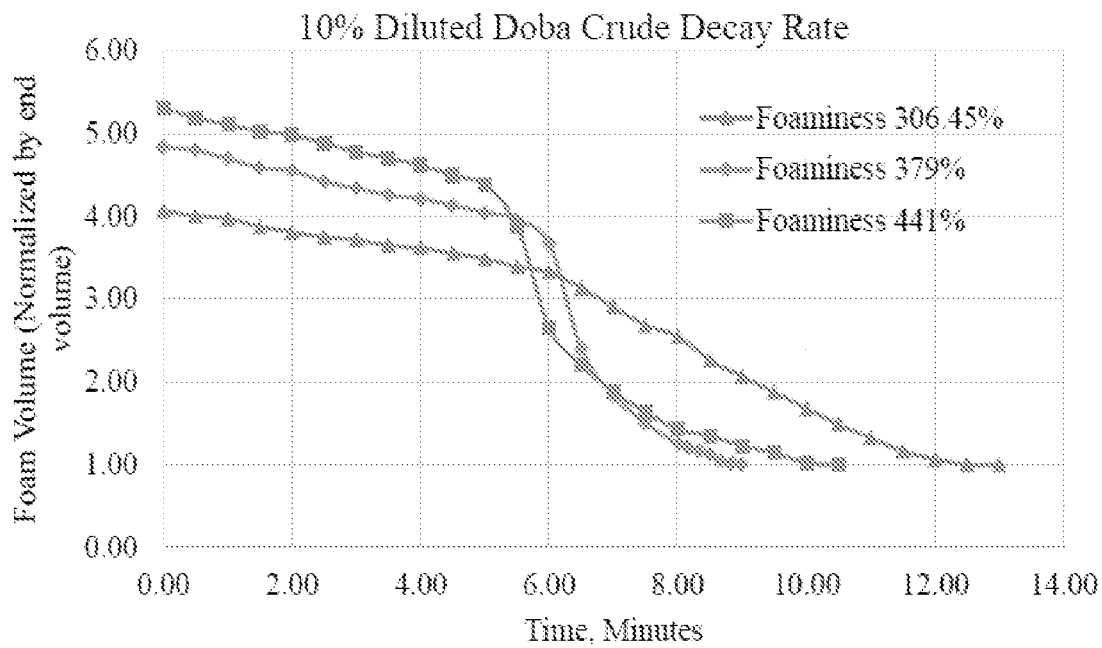

Foam stability may also be measured, as the ability of the mixture to hold the foam during the non-thermal plasma is desirable. The foam decay rate has been analyzed for different foams, and FIGS. 5A and 5B illustrates the foam decay rate for 5% diluted and 10% diluted heavy crude oil-crude solution ("DOBA" in FIG. 5 is a heavy crude oil from Saudi Arabia). The y-axis represents the volume of the foam normalized by the final foam volume, and is plotted against the time it takes for all the gases trapped into the liquid to escape. For each dilution, foams of differing foaminess have been analyzed and they follow the similar trend foam decay. For an initial time period, the slope of the decay rate is small. This is because during this initial time period there is still partial nucleation occurring inside the liquid for foam formation, although most of the nucleation has occurred by the time the foam is collected. After the initial time period is passed, the bubbles coalesce and the decay rate increases.

The gas-liquid interfacial area has been compared for cannulated systems and for the foaming system described herein. Cannulated systems include where one or both of a pair of electrodes has a capillary, and gas is introduced to the electrode gap through the capillary. An illustration of a cannulated system may be found in U.S. Pat. No. 9,988,579. The foaming systems described herein mix the crude oil with a gas upstream of the plasma reactor. In both systems, an electrode spacing of "l," an electrode diameter D, and a bubble diameter d, are used. Because gas is bubbled through a capillary it is assumed that the cannulated system has 'n' number of bubbles of diameter 'd' filling up the gap between the electrodes in a linear manner. There is also an oil thickness, t, between each bubble. The relationship is then provided by the following equation:

$$n = \frac{l - n*t}{d} = \frac{l}{d+t}$$

Because the surface area of a bubble is $A=\pi d^2$, the total surface area of n bubbles in the vicinity of the electrodes is provided by the following equation:

$$A_{cannulated} = \pi \cdot d^2 \cdot n = \pi \cdot d^2 \cdot \frac{l}{d+t}$$

Diameter, d, for the cannulated electrode will depend on the capillary size and gas flow rate.

For a foaming system, the gas fraction of foam is x. The volume of gas between two electrodes is then provided by the following equation:

$$V = \frac{\pi}{4} d^2 l \cdot x$$

The volume of a single bubble is provided by the following equation:

$$V_{bubble} = \frac{4}{3} \pi \cdot d^3$$

Therefore, the number of bubbles in the vicinity of the electrodes can be determined according to the equation:

$$n = \frac{V}{V_{bubble}} = \frac{\frac{\pi}{4}D^2 \cdot l \cdot x}{\frac{4}{3}\pi \cdot d^3} = \frac{3}{16}\frac{D^2 l \cdot x}{d^3}$$

Finally, the surface area of the gas bubbles in a foaming system is determined as:

$$A_{foamy} = \pi \cdot d^2 \cdot n = \pi \cdot d^2 \cdot \frac{3}{16}\frac{D^2 l \cdot x}{d^3} = \frac{3\pi}{16}\frac{D^2 l \cdot x}{d}$$

Typically, the diameter of bubbles in a cannulated reactor is about 2 mm, and there is a 0.5 mm gap between bubbles. In contrast, the foaming system described herein, generates heavy crude oil with a bubble diameter of approximately 250 microns. The electrode spacing is 5 mm, the diameter of the electrode is about ⅛ inches, and the gas fraction in the foam is about 70%.

Putting all these values in $A_{cannulated}$ and $A_{foamy}$, the result is:

$$\frac{A_{foamy}}{A_{cannulated}} = \frac{8.3 * 10^{-5} m}{2.5 * 10^{-5} m} = 3.32$$

Figure 6:
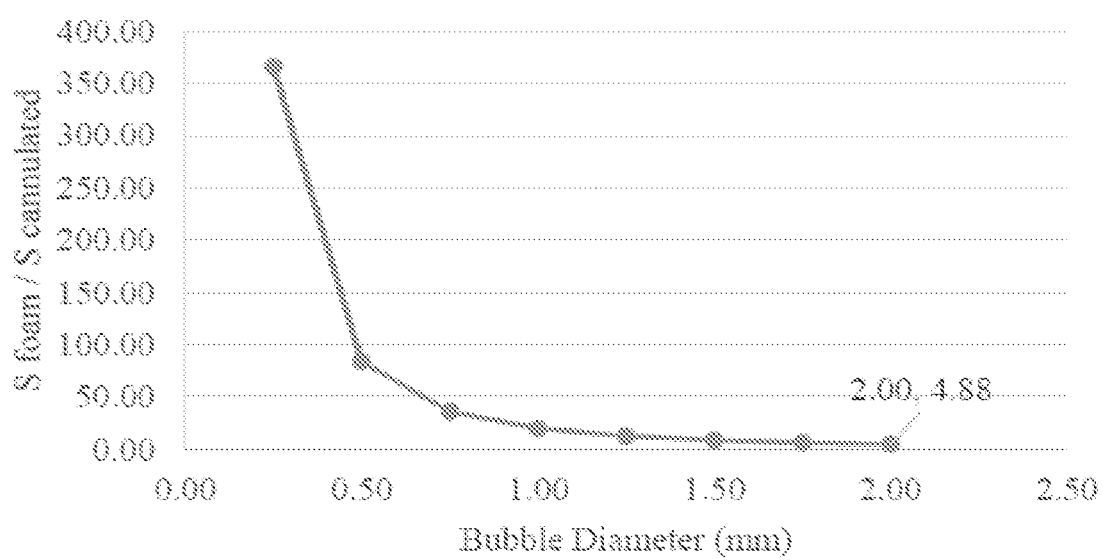
FIG. 6 is a representative of the ratio of the cross section between foam and cannulated electrode with different bubble sizes, according to various embodiments.

The effect of bubble size on the cross sectional area ratio is shown in FIG. 6. For the same bubble size in both a foam and a cannulated system the cross sectional area ratio is significantly higher in foam system. The smaller the bubble size, the grater the ratio. Thus, processing of a heavy hydrocarbon in foam increases the plasma-liquid interaction by at least 4.88 times more than for a cannulated system. This increases the efficiency of crude oil processing, thereby reducing overall costs for production.

Figure 7:
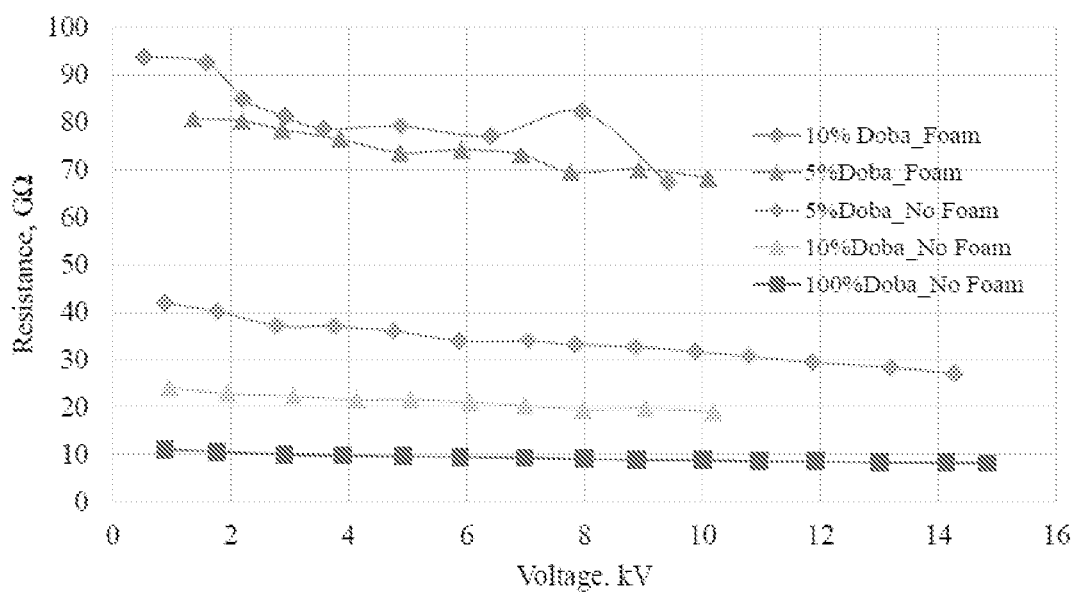
FIG. 7 is a representation of resistivity of foaming and non-foaming systems, according to various embodiments.

It has been observed that one advantage of using a foaming system for plasma generation is the reduced conductivity, or increased resistivity of the system. FIG. 7 illustrates how resistivity of a system with, and without, foam varies with differing voltage. Resistivity of a system with foam is much higher than a no-foam system, which results in lower conductivity. This is because the conductivity of gas is much less than crude oil, and more gas fraction between the electrodes further reduces the conductivity of the foam. Lower conductivity results in less energy dissipation into the system between the electrodes, which would otherwise heat the foam, instead of resulting in non-thermal plasma discharge. FIG. 7 also illustrates how, with the addition of mineral oil to modify the viscosity of the crude, the resistivity of the system increases. For foaming systems, the conductivity also depends on the gas fraction present in the foam. Although the resistivity for a foam with 5% heavy crude oil in 95% mineral oil mixture is greater than that for a mixture of 10% heavy crude oil in 90% mineral oil mixture, the resistivity may overlap in some regions or it may be the opposite depending on the gas fraction present in the foam. In other words, when there is no foam, a 5% mixture is more resistive than a 10% mixture. However, for the foam, the resistivity depends on the foaminess: if the foaminess is the same resistivity will follow the previous trend; but if the foaminess changes, so too does the resistivity. In some cases, the resistivity of a 10% foam can be higher than a 5% foam.

Figure 8:
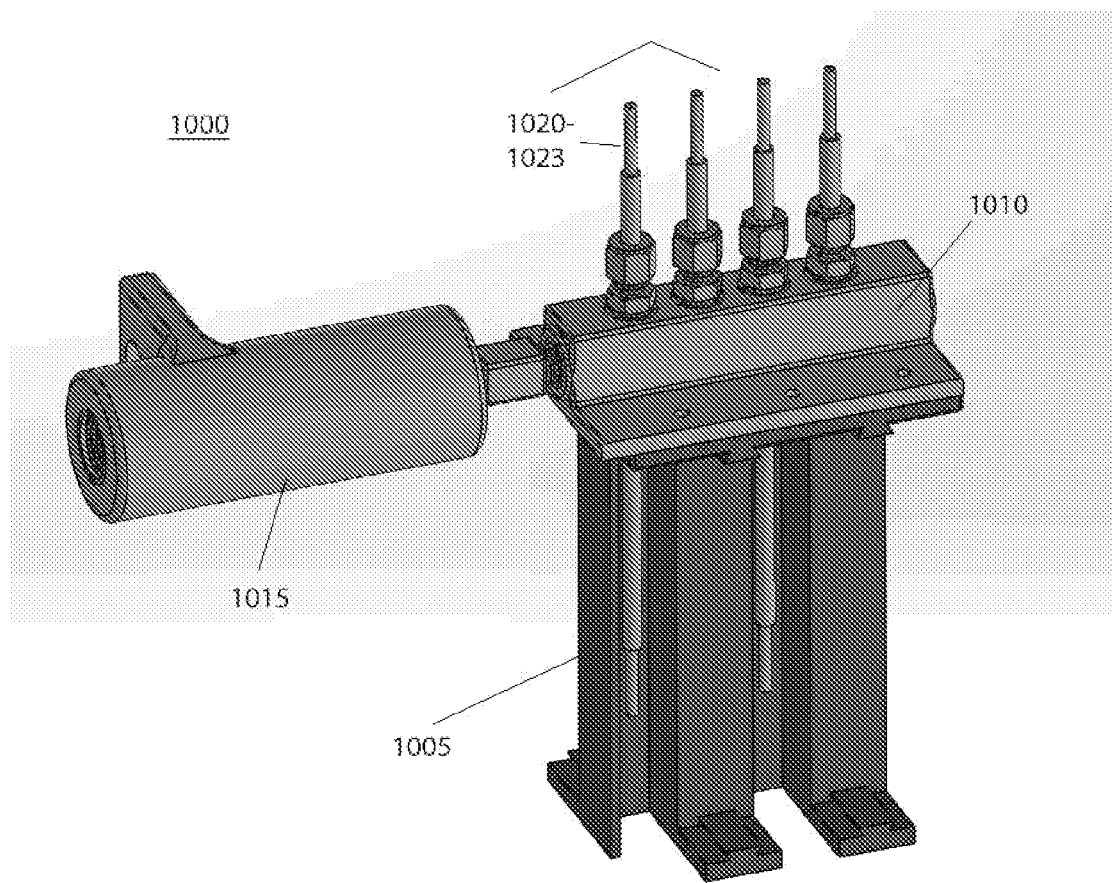
FIG. 8 is a depiction of a plasma discharge in foam in the region between electrodes, according to various embodiments.
Figure 9A:
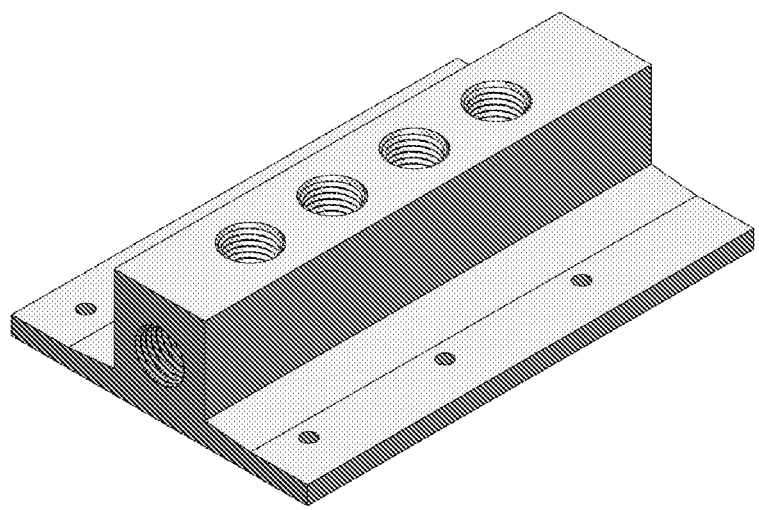
FIG. 9A illustrates an isolated view of the plasma chamber without electrodes and FIG. 9B illustrates a cross-sectional view of the plasma chamber, according to various embodiments.
Figure 9B:
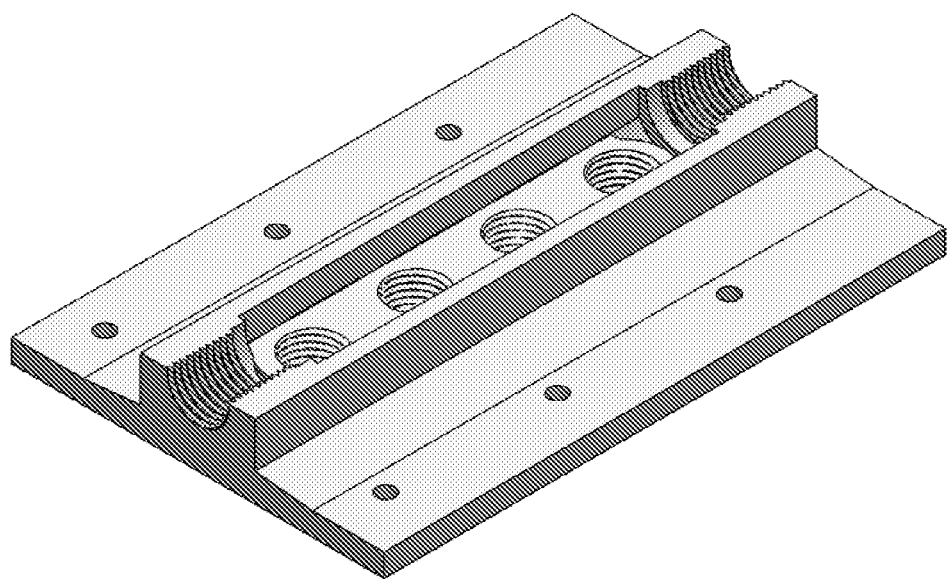

FIG. 8 illustrates a coupled 1000 plasma discharge reactor 1010 with a foam generator 1015, and positioned on a mount 1005. Attached to the plasma discharge reactor 1010 are illustrated four plasma discharge electrodes 1020-1023 (of the same polarity in the illustration), with four counter electrodes below and within the mount 1005). Inside the plasma discharge reactor is chamber into which foam can be introduced. The foam then passes into the discharge gap between the electrodes where non-thermal discharge breaks down the heavy crude oil foam into lighter fractions that are then exited from the reactor 1010 at a point opposite to where the foam generator 1015 is attached. The reactor may be designed to house as may pairs of electrodes as desired. FIGS. 9A and 9B are further view of the reactor 1010 in full view (9A) and cross-sectioned (9B).

Figure 10:
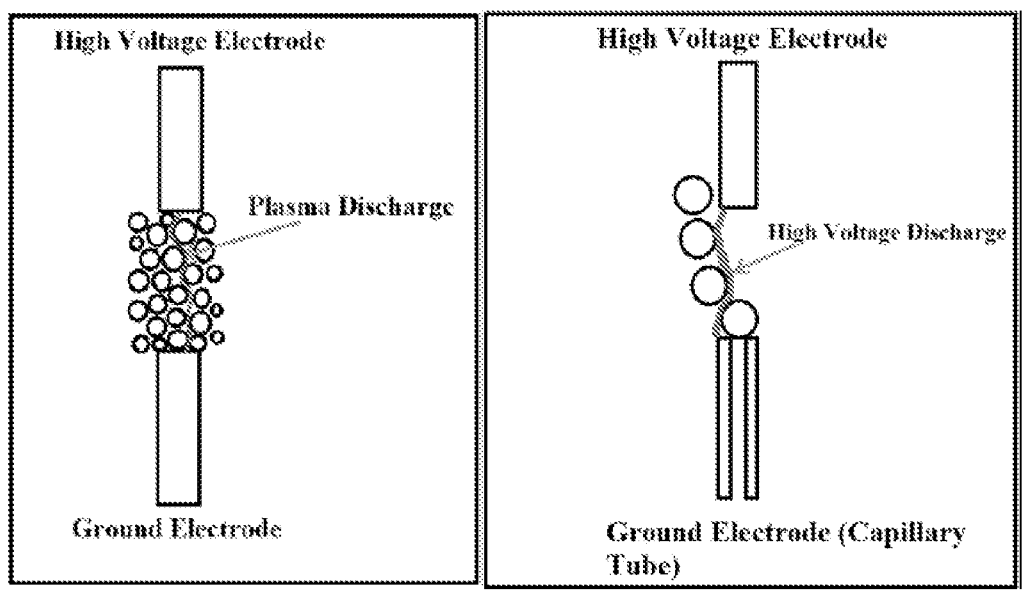
FIG. 10 provides a schematic of discharge in foam (left) and a cannulated reactor system (right), according to various embodiments.
Figure 11:
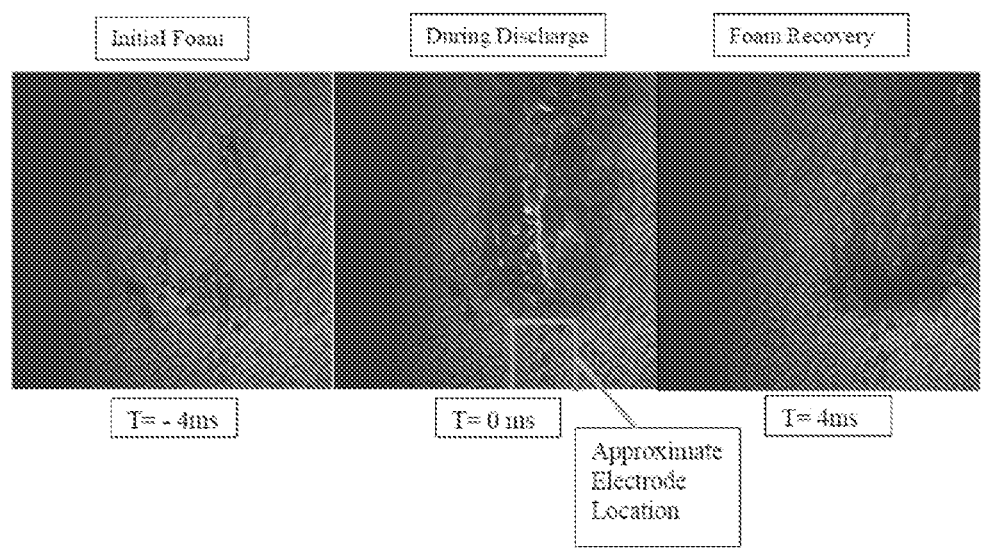
FIG. 11 provides pre-discharge (left), during discharge (middle), and post-discharge (right) plasma conditions, using high speed camera and microscope, according to various embodiments.

FIG. 10 illustrates a plasma discharge through a foam system and a conventional plasma treatment of the crude oil reactor or cannulated plasma reactor. For heavy hydrocarbon processing, a plasma may be generated with a cannulated reactor where gas is bubbled though a capillary into the liquid crude. The electrodes themselves are used as the capillary tubes to carry the bubbling gas. In a cannulated system, larger and fewer gas bubbles are generated between the electrodes (right hand window) in comparison to the foaming system described herein (left hand window). FIG. 10 illustrates how a foaming system increases the gas-liquid interface between two electrodes. Since most of the chemical reactions during the plasma processing occur at the gas-liquid interface, the foaming system yields a better product outcome in terms of a higher conversion rate and greater distribution of the lighter products.

FIG. 12 illustrates the pre-, during-, and post-plasma discharge conditions. The plasma reactor is designed such that the foam residence time between the electrodes is more than the time between two discharges. This helps avoid the same foam from recirculating between the electrodes, with the multiple discharge repeatedly going through the same foam. FIG. 12 depicts how, after breakdown, new foams rush in between the electrodes to replace the liquid that has been generated from the coalesced bubbles due to the shockwave of the discharge.

Development of the foaming reactor for depressurization of dissolved gases to produce high volume fraction of gas in foam has been shown to be efficient by achieving a desired level of foaming. This creates a foam that is better suited to reformation by plasma discharge that in systems that use mere bubbling through liquid, resulting in efficient conversion of heavier hydrocarbons to lighter hydrocarbons.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A method of conversion of a heavy crude oil to lighter hydrocarbons with a non-thermal plasma, the method comprising:
generating a pressurized mixture of a hydrogen containing gas and the heavy crude oil at a first pressure;
passing the pressurized mixture through a nozzle into a chamber maintained at a second pressure that is lower than the first pressure, wherein upon passing through the nozzle the pressurized mixture forms a crude oil foam; and
subjecting the crude oil foam to a non-thermal plasma reactor to convert at least a portion of the heavy crude oil into lighter hydrocarbons.

2. The method of claim 1, wherein the crude oil foam exhibits an average bubble diameter of 100 to 150 microns.

3. The method of claim 1, wherein the crude oil foam has a volume that is at least two times greater than the heavy crude oil used to form the foam.

4. The method of claim 1, further comprising conveying an effluent from the non-thermal plasma reactor, the effluent comprising unreacted heavy crude oil and the lighter hydrocarbons, wherein a concentration of the lighter hydrocarbons is greater in the effluent than in the pressurized mixture.

5. The method of claim 1, further comprising collecting a product stream comprising the lighter hydrocarbons.

6. The method of claim 1, further comprising mixing the heavy crude oil with a diluent prior to generating the pressurized mixture.

7. The method of claim 6, wherein the diluent comprises mineral oil or a light hydrocarbon liquid.

8. The method of claim 1, wherein forming the crude oil foam comprises:
feeding the pressurized mixture to a fluid inlet of a foam generator; and
accelerating the pressurized mixture by passing the pressurized mixture from the fluid inlet to the nozzle, wherein the nozzle has a nozzle diameter that is smaller than a fluid inlet diameter of the fluid inlet.

9. The method of claim 8, wherein the pressurized mixture that is fed to the fluid inlet has a pressure of at least 100 psig.

10. The method of claim 8, wherein forming the crude oil foam further comprises depressurizing the mixture by passing the pressurized mixture to the chamber, wherein the chamber has a chamber diameter that is greater than the nozzle diameter.

11. The method of claim 8, further comprising receiving the crude oil foam from a fluid outlet of the foam generator, wherein the fluid outlet is connected to the chamber.

12. The method of claim 1, wherein the crude oil foam is formed using a foam generator of an apparatus, the foam generator having a high-pressure side upstream of the nozzle and a low-pressure side downstream of the nozzle, with the nozzle and the chamber structured such that, in generating the crude oil foam, the apparatus accelerates and depressurizes the mixture as the mixture passes through the nozzle and into the chamber.

13. The method of claim 1, wherein the hydrogen containing gas is a C1-C5 hydrocarbon gas.

14. The method of claim 13, wherein the hydrogen containing gas is methane, ethane, propane, n-butane, iso-butane, n-pentane, iso-pentane, or neo-pentane.

15. The method of claim 1, wherein a pressure difference between the fluid inlet and the chamber is greater than about 140 psig.

16. The method of claim 1, further comprising receiving an effluent from the non-thermal plasma reactor, the effluent comprising a higher concentration of lighter hydrocarbons than were present in the pressurized mixture.

17. The method of claim 1, wherein the heavy crude oil is received in a first tank, and wherein an effluent from the non-thermal plasma reactor is received in a second tank, the method further comprising receiving and separating the lighter hydrocarbons from the effluent.

18. The method of claim 17, further comprising returning a stream from a condensor to the first tank to return unreacted heavy crude oil and other reaction products from the non-thermal plasma reactor to the first tank, the condenser being fluidly connected to the second tank.

* * * * *

UNITED STATES PATENT AND TRADEMARK OFFICE
CERTIFICATE OF CORRECTION

| | | |
|---|---|---|
| PATENT NO. | : 12,227,703 B2 | Page 1 of 1 |
| APPLICATION NO. | : 17/911609 | |
| DATED | : February 18, 2025 | |
| INVENTOR(S) | : David Staack et al. | |

It is certified that error appears in the above-identified patent and that said Letters Patent is hereby corrected as shown below:

On the Title Page

"(73) Assignee: Texas A&M University System,
　　　　　　　College Station, TX (US)"

Should read:

-- (73) Assignees: Texas A&M University System,
　　　　　　　　College Station, TX (US);
　　　　　　　　LTEOIL LLC,
　　　　　　　　Houston, TX (US) --

Signed and Sealed this
First Day of April, 2025

Coke Morgan Stewart
*Acting Director of the United States Patent and Trademark Office*